C. C. SHEPHERD.

Slate.

No. 8,699. Reissued May 6, 1879.

Witnesses

Chas H. Smith

Geo. D. Pinckney

Inventor

Charles C. Shepherd.

per Lemuel W. Serrell atty.

N. PETERS, PHOTO-LITHOGRAPHER, WASHINGTON, D. C.

UNITED STATES PATENT OFFICE.

CHARLES C. SHEPHERD, OF PASSAIC, NEW JERSEY.

IMPROVEMENT IN SLATES.

Specification forming part of Letters Patent No. 165,126, dated June 29, 1875; Reissue No. 8,699, dated May 6, 1879; application filed February 17, 1879.

*To all whom it may concern:*

Be it known that I, CHARLES C. SHEPHERD, of Passaic, in the county of Passaic and State of New Jersey, have invented an Improvement in School-Slates, of which the following is a specification.

Before my invention a slate had been made with a frame surrounding it, and also extending beyond the slate itself, to form a secondary frame, into which the copy sheets or slats were introduced; but in this instance the cross-piece of the frame intervened between the copy-sheets and the slate itself, and hence the said copy sheet or slat was unnecessarily removed from the slate itself, and the surfaces were not at the same level.

With scholars that are commencing to learn drawing or writing it is preferable to have the copy slat or sheet on the same level as the slate, and close to it, so that the pupil can more easily follow the copy; furthermore, it is preferable to have the slate supported at an inclination.

My invention relates to a slate and its frame in which the slate is not as large as the frame, and an opening is left for the introduction of the copy sheet or slat at one edge of the slate, and on a level, or nearly so, therewith; and I also support said slate at an inclination by combining therewith a supporting-frame, which also forms a box for the reception of the copy sheets or slats.

Figure 2:
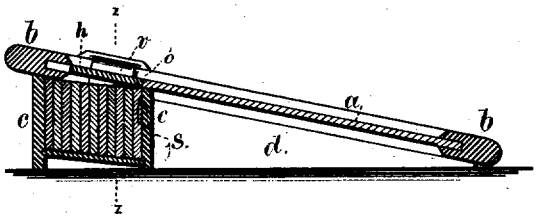
Figure 3:
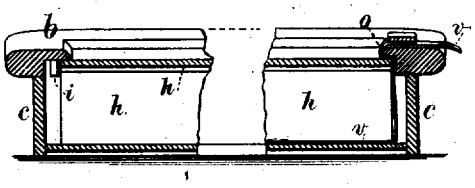
Figure 1:
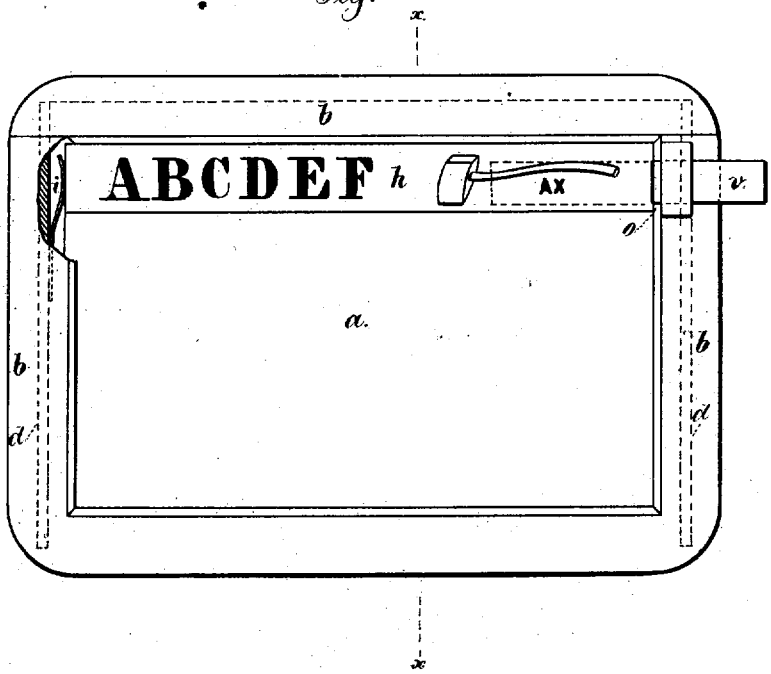

In the drawings, Figure 1 is a plan, Fig. 2 is a section at the line *x x*, and Fig. 3 represents the two ends, of the box and copy-slats, at the line *z z*.

The slate *a* and frame *b* are supported by the box *c*, that is attached to the under side of the frame, and the end pieces *d* of the box extend beyond the said box and are triangular, so as to sustain the slate and frame in an inclined position, similar to the surface of a desk.

The slate *a* does not extend over the box, but said box is open for the reception of the copy-slats *h*, that are preferably of wood covered with paper containing the letters, figures, or designs to be copied.

The slat that is to be used is of a width to act as a cover to the box. One end of the same is entered into position and pressed against the spring *i*, which yields sufficiently to allow the other end of the slat to pass down the incline at *o* and catch beneath its lower edge by the spring moving said slat endwise.

The slat may rest at one edge upon the support *s*, forming one side of the box.

It will be evident that the copy is on the same level, or nearly so, as the slate, because the slate itself is not as wide as the frame, and there is an open space within the slate-frame for the reception of the copy sheet or slat.

In order to liberate the slat when the same is to be changed, I make use of a tape, *v*, or strip of muslin, or similar material, that is attached at its inner end within the box, preferably by glue. The other portion hangs over the incline *o*. Hence said strip is crimped over the end of the slat as said slat is forced into place; but when the end of this strip *v* is pulled upon it serves to move the slat endwise, and liberate the end of said slat from beneath the edge of *o*, and raise said slat from the slate, so that it may be changed.

One of the triangular end pieces, *d*, may be made with a hole bored into it from the back, of a size adapted to receive a slate-pencil, and a turning-plate forming a cover may be applied at the end.

I claim as my invention—

1. The combination, with the slate, of a complete and rigid frame, the internal measurement of which corresponds in one direction with the slate, and in the other direction it is greater than the slate, so as to leave an opening for the introduction of the copy slip or sheet between the edge of the slate and the frame, substantially as set forth.

2. The combination, with a portable slate and its frame, of a copy sheet or slat introduced within the slate-frame, and a support for holding the slate and frame in an inclined position, substantially as set forth.

3. The slate *a* and frame *b*, with the box *c*, attached to the under side of the slate-frame to form a support, and the movable copy-slats *h*, all combined and arranged substantially as and for the purposes set forth.

4. The combination, with a slate-frame, of the spring *i*, strip or tape *v*, and movable copy-slat *h*, substantially as set forth.

Signed by me this 14th day of February, A. D. 1879.

CHAS. C. SHEPHERD.

Witnesses:
GEO. T. PINCKNEY,
CHAS. H. SMITH.